US00RE35381E

United States Patent [19]

Rose

[11] E Patent Number: Re. 35,381

[45] Reissued Date of Patent: Nov. 26, 1996

[54] BALLISTIC OPTIMIZING SYSTEM FOR RIFLES

[75] Inventor: Clyde E. Rose, South Weber, Utah

[73] Assignee: Browning, Morgan, Utah

[21] Appl. No.: 545,132

[22] Filed: Oct. 19, 1995

Related U.S. Patent Documents

Reissue of:

[64] Patent No.: 5,279,200
Issued: Jan. 18, 1994
Appl. No.: 912,796
Filed: Jul. 13, 1992

[51] Int. Cl.[6] ..... F41A 21/36

[52] U.S. Cl. ..... 89/14.3; 42/97

[58] Field of Search ..... 42/75.02, 76.01, 42/79, 97, 105; 89/14.05, 14.1, 14.2, 14.3, 14.4, 14.5

[56] References Cited

U.S. PATENT DOCUMENTS

| | | | |
|---|---|---|---|
| Re. 20,958 | 12/1938 | White | 42/79 |
| 592,437 | 10/1897 | Oberhammer | 42/79 |
| 1,892,522 | 12/1932 | White | 42/79 |
| 1,900,790 | 3/1933 | Brandt | 42/105 |
| 2,153,246 | 4/1939 | Gibson | 42/79 |
| 2,165,457 | 7/1939 | Cutts, Jr. | 89/14.3 |
| 2,191,484 | 2/1940 | Hughes | 89/14.3 |
| 2,302,699 | 11/1942 | Klipsch | 42/79 |
| 2,340,821 | 2/1944 | Russell | 89/14.3 |
| 2,372,568 | 3/1945 | Grigg | 42/75.01 |
| 2,428,232 | 9/1947 | Limon | 42/79 |
| 2,442,899 | 6/1948 | McAllister | 89/14.3 |
| 2,453,747 | 11/1948 | Egleson | 42/79 |
| 2,466,104 | 4/1949 | Hilburn | 89/14.3 |
| 2,499,428 | 3/1950 | Tiffany | 89/14.3 |
| 2,558,200 | 6/1951 | Schmeling | 89/14.3 |
| 2,589,738 | 3/1952 | Sedberry | 89/14.3 |
| 2,629,958 | 3/1953 | Roper et al. | 89/14.3 |
| 2,656,637 | 10/1953 | Richards | 89/14.3 |
| 2,662,326 | 12/1953 | Powell | 89/14.3 |
| 2,668,479 | 2/1954 | Batten | 89/14.3 |
| 2,712,193 | 7/1955 | Mathis | 89/14.3 |
| 2,796,005 | 6/1957 | Shapel | 89/14.3 |
| 2,809,560 | 10/1957 | Matson et al. | 89/14.3 |
| 2,921,396 | 1/1960 | Larson | 42/97 |
| 2,953,972 | 9/1960 | Sorensen | 89/14.3 |
| 3,114,289 | 12/1963 | Aulabaugh | 89/14.3 |
| 3,161,979 | 12/1964 | Lowe | 42/79 |
| 3,164,060 | 1/1965 | Dahl | 89/14.3 |
| 3,187,633 | 6/1965 | Tanabe | 89/14.3 |
| 3,202,056 | 8/1965 | Seeberger | 89/14.3 |

(List continued on next page.)

FOREIGN PATENT DOCUMENTS

| | | | |
|---|---|---|---|
| 588100 | 12/1959 | Canada | 89/14.3 |
| 1075987 | 2/1960 | Germany | 42/105 |
| 127231 | 11/1919 | United Kingdom | 42/105 |
| 594515 | 11/1947 | United Kingdom | 89/14.3 |

OTHER PUBLICATIONS

Webster's II New Riversid University Dictionary, "tune", 1984, p. 1243.

Petty, Charles E., "Bowling Pins and Beyond", American Rifleman, vol. 134, No. 3, Mar. 1986, pp. 29–3

D. S. Tanabe of Seattle, Washington, Contra–Jet Muzzle Brake Brochure, 1971.

(List continued on next page.)

*Primary Examiner*—Michael J. Carone
*Attorney, Agent, or Firm*—Foster & Foster

[57] ABSTRACT

A ballistic optimizing system for use on a preferably bedded rifle comprising a movable weight element secured to the end of a rifle barrel such that said weight element can be moved axially along said barrel to change the effective weight applied for *vibration* dampening purposes and having an indicator for indicating the relative position of said weight element on said barrel and further including an additional weight releasably secured to said movable weight element and ports through said weight element to allow gas escape.

66 Claims, 6 Drawing Sheets 1.

U.S. PATENT DOCUMENTS

| | | | |
|---|---|---|---|
| 3,208,348 | 9/1965 | Lee | 89/14.3 |
| 3,340,641 | 9/1967 | Recker | 42/97 |
| 3,455,203 | 7/1969 | Pillersdorf | 89/14.3 |
| 3,492,750 | 2/1970 | Ashbrook et al. | 89/14.3 |
| 3,496,667 | 2/1970 | Lowry | 42/79 |
| 3,604,136 | 9/1971 | Edwards | 42/97 |
| 3,618,245 | 11/1971 | Pruonto | 42/97 |
| 3,698,747 | 10/1972 | Wing et al. | 89/14.3 |
| 3,714,864 | 2/1973 | Thierry | 89/14.3 |
| 3,732,778 | 5/1973 | Bettermann et al. | 42/97 |
| 4,341,283 | 7/1982 | Mazzanti | 181/223 |
| 4,374,484 | 2/1983 | Bekker et al. | 89/14.3 |
| 4,392,413 | 7/1983 | Gwinn, Jr. | 89/14.3 |
| 4,510,843 | 4/1985 | Rabatin | 89/14.4 |
| 4,558,532 | 12/1985 | Wright | 42/94 |
| 4,635,528 | 1/1987 | McQueen | 89/14.3 |
| 4,726,280 | 2/1988 | Frye | 89/14.05 |
| 4,813,333 | 3/1989 | Garris et al. | 89/14.3 |
| 4,869,151 | 9/1989 | Chahin | 89/14.3 |
| 4,879,942 | 11/1989 | Cave | 89/14.3 |
| 4,913,031 | 4/1990 | Bossard et al. | 89/14.3 |
| 4,971,208 | 11/1990 | Reinfried et al. | 42/94 |
| 5,058,302 | 10/1991 | Minneman | 42/94 |
| 5,092,223 | 3/1992 | Hudson | 89/14.2 |
| 5,105,717 | 4/1992 | Pond | 89/14.3 |
| 5,119,716 | 6/1992 | Bartolles | 89/14.3 |
| 5,173,563 | 12/1992 | Gray | 42/64 |

OTHER PUBLICATIONS

Precision Shooting Magazine, advertisement entitled "Accu–Brake SA," Nov. 1995.

Webster's New World Dictionary of the American Language, College Edition, "firearm, gun, rifle", pp. 545, 646, 1253.

Klipsch; "Tuning Up Small Bore Rifles"; *The American Rifleman;* Jun. 1939; pp. 7–9.

Klipsch; "Tuning Up Small Bore Rifles, Some Further Progress", *The American Rifleman;* Dec. 1939; pp. 8–9.

"Anschutz Model Supermatch 2013"; *The American Rifleman;* Dec. 1992; pp. 51–53.

"The Recoil Robbers"; *Field & Stream;* May 1992; pp. 64–67.

Hunnicutt; "Air–to–Air Combat"; *The American Rifleman;* Jan. 1989; pp. 38–43; 80.

"Barrel Vibrations"; *Reloading Handbook,* 46th Ed.; (date unknown); pp. 136–137.

Swenson; "Barrel Vibration & Behavior"; *Precision Shooting;* (prior art, date unknown); 2 pages.

Dietz; "Making Varmit and Hunting Rifles Shoot Like Bench Rest Rifles or Varmit and Hunting Rifles that Shoot Like Bench Rest Guns"; *Precision Shooting;* Nov. 1985; pp. 14–19.

"Accuracy Tuner"; p. 11 of unknown catalog; (date unknown).

Luttmann; "Greater Shooting"; (date unknown); pp. 50–54.

Grigg; "This Vibration Business"; *Precision Shooting;* (prior art, date unknown); 3 pages.

Grigg; "Dynamics of the Bolt Action Rifle"; *Precision Shooting;* (prior art, date unknown); pp. 4–7.

Grigg; "Bullet Fit and the Bernoulli Theorem"; *Precision Shooting;* (prior art, date unknown); 6 pages.

Grigg; "Further 'Vibration' Comment"; *Precision Shooting;* (prior art, date unknown); 1 page.

"Sporter Rifles—Silhouette Rifles—Match Rifles—Pistols—Air Rifles", Anschutz Catalog (Precision Sales International, Inc.); 1989; (17 pages).

Amber; "Chokes & Brakes"; *Gun Digest;* Dec. 1972; p.426.

"The Muzzle Mizer"; (date unknown); 2 pages.

Wilson; "The Accura Adjustable Muzzle Stabilizer"; (date unknown); 13 pages.

Horowitz; "Barrel Stiffness"; *Precision Shooting;* Feb. 1976; pp. 8–9.

Hollister; "Smallbore Notes"; *Precision Shooting;* Jun. 1970; p. 22.

Pope; "The Real Movements of a Rifle in Firing"; *Arms and the Man;* Mar. 1914; pp. 4–5.

Audette; "The Movements of a Rifle Barrel Prior to Bullet Exit"; *Precision Shooting;* (date unknown); pp. 4–7.

Audette; "Barrel Vibration"; *Precision Shooting;* Dec. 1960; 4 pages.

Audette; "Barrel Vibration"; *Precision Shooting;* (prior art, date unknown); 1 page.

Audette; "Commentary"; *Precision Shooting;* Jun. 1984; pp. 5–11.

"Damping Barrel Vibration"; *Precision Shooting;* (prior art, date unknown); 1 page.

"Comments on Vibration"; *Precision Shooting;* (prior art, date unknown); 2 pages.

Hall; "The Making of the One–Eighth Minute Rifle"; *Precision Shooting;* Dec. 1986; 1 page.

Stekl; "Epoxy Barrel–Bedding Method"; *Precision Shooting;* Mar. 1974; pp. 16–18.

Whelen; "Jump, Vibration and Barrel Weight"; *Precision Shooting;* (prior art, date unknown); 2 pages.

Friesecke; "A Barrel Vibration Experiment"; *Precision Shooting;* (prior art, date unknown); 1 page.

Hausmann et al, Physics, "Harmonic Motion", pp. 150–161. 1939.

BALLISTIC OPTIMIZING SYSTEM FOR RIFLES

Matter enclosed in heavy brackets [ ] appears in the original patent but forms no part of this reissue specification; matter printed in italics indicates the additions made by reissue.

BACKGROUND OF THE INVENTION

1. Field

This invention relates to rifles and particularly to systems for increasing the accuracy of rifles. It is particularly directed to systems including weight devices affixed to the muzzle end of rifle barrels to dampen vibration resulting from the firing of bullets through such barrels. It is also directed to muzzle brakes attached to rifle muzzles to channel discharged propulsion gases in directions other than axially as the slug from a fired bullet travels the length of the barrel.

2. State of the Art

There has long been a desire among marksmen for firearms to be as accurate and consistent as possible during firing. This desire is particularly characteristic of marksmen who engage in rifle target shooting competitions. Consequently, considerable effort has *been* to eliminate or at least minimize those factors that adversely affect accurate shooting. It is well recognized that two of the factors adversely affecting accurate rifle marksmanship are (1) the barrel vibration which inevitably occurs upon firing of the weapon and (2) the recoil to which the marksman is subjected upon firing. Attempts to eliminate such barrel vibration and recoil have involved the use of various types and kinds of bedding materials as shock absorbers and dampeners between the barrel and the action assemblies and stocks of a rifle. The kinds and positioning of mounting screws associated with the components of a rifle have been the subject of design scrutiny. Different stock and barrel configurations have been tried. Nevertheless, inconsistent paths of trajectory of ballistic slugs discharged from their muzzles remain inherently characteristic of rifles. [These inconsistencies are particularly objectionable with the firing of certain factory loaded cartridges, due to the vibrations of the barrels which are inevitably set in motion upon discharge of a firearm which is not designed specifically for use with that cartridge.]

It has been recognized that, in some cases, it is possible to "match" a particular rifle with a particular cartridge to minimize barrel vibration, thereby to increase accuracy. To "match" a cartridge with a particular rifle, it may be necessary to vary [slug] *bullet* weight *or type*, the type [and] *or* amount of powder used, or other factors[, such as the center of gravity of the rifle]. A best match of ammunition will result in the exiting of a [slug] *bullet* from the barrel muzzle at or as near as possible to [the peak] *a anti-node* (*i.e., peaks and valleys that correspond to minimum barrel velocity*) of the vibration curve [for the] *representative of transverse* barrel vibrations induced by the firing of the rifle. When the exit of the bullet is at a [peak] *node* of the vibration curve *as plotted against time*, minimal bullet path deflection occurs (*see FIG. 8*).

Weights have been heretofore attached to the muzzle ends of rifle barrels as a means of dampening barrel vibrations set in motion by discharge of the firearm. U.S. Pat. No. 4,726,280, for example, discloses mounting a muzzle member[, which serves as a counterweight] on the muzzle end of a gun barrel. *Although not stated in U.S. Pat. No. 4,726,280, it is generally understood that such a muzzle member may serve as a counterweight.* The muzzle member is threaded onto the barrel, and is locked in place. Anschutz and Co. G.M.B., through the 1989 catalog of its distributor, Precision sales International, Inc of Westfield, Mass., discloses, at pages 11 and 16, barrel extensions for rifles that include removable weights. [Interchanging these weights enables a marksman to vary selectively the amount of weight used for dampening purposes.] *Although not stated in the 1989 catalog of Anschutz and Co. G.M.B., it is understood that interchanging such weights may enable a marksman to vary selectively the amount of weight used for damping purposes.*

Muzzle brakes have also been used in the past with rifles. The known muzzle brakes function to exhaust propulsion gases as a means of reducing recoil and of dissipating propulsion gases in a direction or directions other than out the muzzle of the barrel. The muzzle brakes heretofore known characteristically cause a noticeable increase in noise and concussion to the marksman. The known muzzle brakes have been attached to the muzzle end or a rifle barrel, and thus inherently add a dampening weight.

SUMMARY OF THE INVENTION

The ballistic optimizing system (BOS) of the present invention is for the purpose of increasing the shooting accuracy achievable with rifles. The invention provides an adjustable structural means to dampen barrel vibrations. Preferred embodiments additionally provide structural means to reduce recoil [without generation of any significant sound increase, and in some instances with a slight sound reduction].

The system of the invention adds a weight element to the muzzle end of a rifle barrel. The [effective center of gravity] *vibrational characteristics* of the barrel [is] *can be* adjustably changed by positioning the weight element axially along the barrel, either toward or away from its muzzle end. By this means, it becomes possible to "match" the rifle to a particular ammunition. That is, the [slug of a] bullet for which the weight element is properly positioned will *repeatedly* exit the muzzle at [the] *an* optimum time to experience minimum *barrel* travel deflection (*see FIG. 8*). Thus, it is unnecessary to select a cartridge based upon the inherent responses of a particular rifle. Accordingly, factory loaded ammunition can be shot with accuracies heretofore unobtainable, Moreover, different factory loaded cartridges can be fired accurately from the same rifle by merely making appropriate system adjustments.

According to the present invention, the weight element is repositioned selectively forwardly toward or rearwardly away from the muzzle end of a rifle barrel. The mass of the weight element thus becomes a [critical] *controlling* mass. An appropriate mechanism, such as a lock nut, is used to retain the weight element in selected position and contributes some mass to the weight element. For purposes of this disclosure, the locking mechanism is regarded as a portion of the weight element, and its mass is a part of the [critical or] *controlling* adjustable mass. The rifle is matched to a particular ammunition by positioning of the weight element to an empirically determined location, referred to as the "sweet spot." The "sweet spot" is that location of the weight element along the axis of a rifle barrel at which the trajectories of a series of substantially similar [ballistic slugs] *bullets* discharged from the muzzle of the rifle held in a stationary position exhibit a minimum deviation (*see FIG. 8*). The weight element may need to be repositioned to find the "sweet spot" of the rifle for a different cartridge. It has been found that in some instances even very small movements of the [critical] *controlling adjustable* mass will effect a significant change in the accuracy of a rifle filled with the present ballistic optimizing system.

In one presently preferred embodiment of the invention a lock nut is threaded onto a rifle barrel and an interiorly threaded, tubular weight is also threaded onto the barrel to engage and lock against the lock nut. The lock nut has a skirt that telescopes over a portion of the rifle barrel. A graduated linear scale on the barrel cooperates with an edge of the skirt to provide an indication of the position of the lock nut relative to the muzzle of the rifle barrel. A scale around the edge of the skirt is indicative of the extent to which the lock nut and skirt are rotated between full rotations, which full rotations are indexed on the linear scale.

In another presently preferred embodiment of the system of the invention, the wall of an interiorly threaded, tubular weight is provided with angled ports and straight ports therethrough to allow escape of propellant gases. The weight then additionally functions as a muzzle brake to reduce recoil of the rifle when it is fired. A tubular end plug/weight may be threaded into the end of the tubular weight remote from the muzzle end of the rifle to allow passage of a fired ballistic slug while also providing a deflector for concurrently discharging propellant gases. The plug/weight additionally provides a means for making major changes in the "effective weight" (an alternative designation of the position of the center of gravity of the rifle) applied to the muzzle end of the barrel. Plug/weights of varying size, weight and dimensions can be selected for use.

The shape and pattern of the ports and the shape of the deflecting surface of the plug/weight provide for gas escape to minimize recoil [without significant change in noise resulting from firing]. Preferred constructions arrange the ports so that the propulsion gases escaping through adjacent ports mutually impinge.

BRIEF DESCRIPTION OF THE DRAWINGS

In the drawings, which illustrate what is currently regarded as the best mode for carrying out the invention.

DESCRIPTION OF THE ILLUSTRATED EMBODIMENTS

Figure 2:
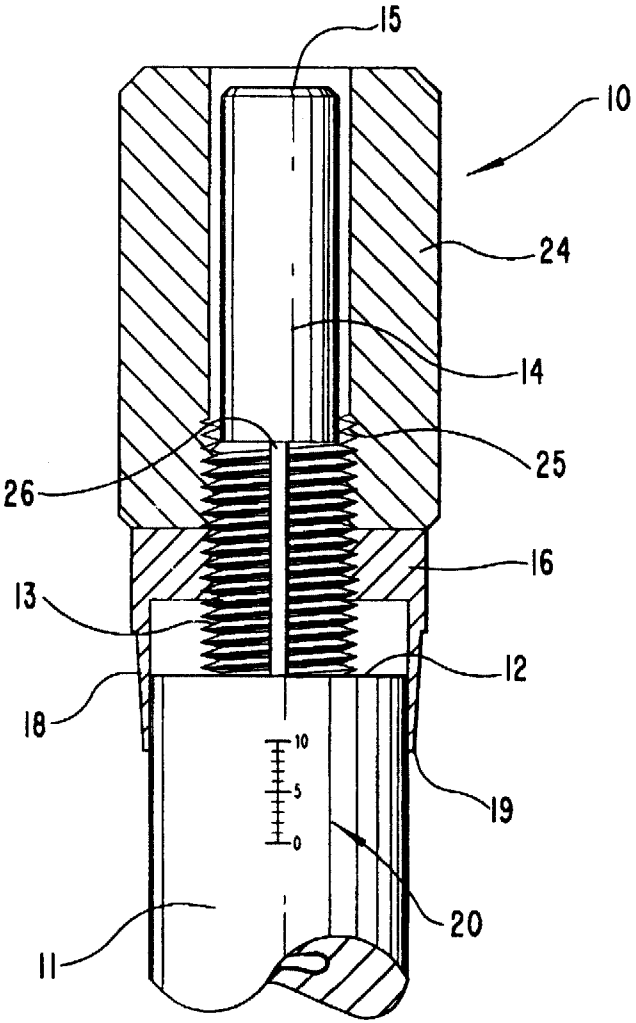
FIG. 2 is a transverse sectional view taken through the dampener of FIG. 1 center line of the, but with the rifle barrel shown in elevation, for clarity.
Figure 1:
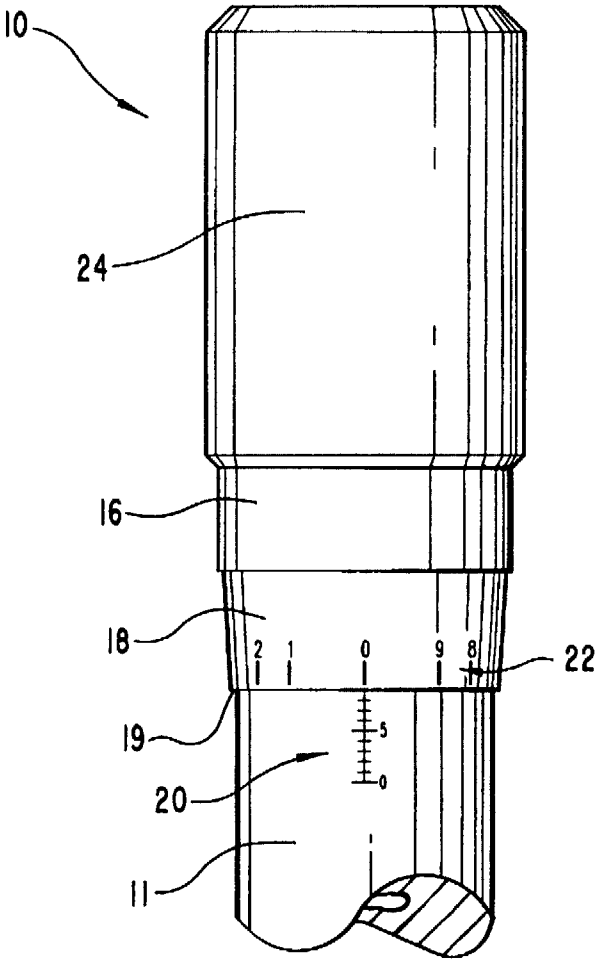
FIG. 1 is a top plan view of a first preferred rifle barrel vibration dampener of the system of the invention, mounted on a rifle barrel that is shown fragmentarily.

In the illustrated preferred embodiment of FIGS. 1 and 2, the system of the invention includes a rifle barrel vibration dampener, shown generally at 10, threaded onto a rifle barrel 11. The barrel 11 is stepped down at a shoulder 12 to a threaded section 13 that terminates in a muzzle 14 having a distal end 15.

A lock nut 16 is threaded onto the section 13 and a skirt 18 of the lock nut extends therefrom to telescope around the barrel 11. The skirt 18 has an edge 19 and the skirt extends over the shoulder 12 so that edge 19 cooperates with a graduated linear scale 20 that has indices on the exterior surface of barrel 11. A linear scale 22 has indices in increments equally spaced around and marked on the skirt 18, adjacent to the bottom edge 19.

The relationship between the indices on the linear scale 20, the threads between barrel section 13 and lock nut 16 and the indices of the linear scale 22 are preferably selected such that turning of the lock nut to turn the skirt one full turn will move the skirt axially, with respect to the barrel, a distance equal to that between adjacent index markings along the linear scale 20.

A tubular weight 24 has one end interiorly threaded at 25, is telescoped over the distal end 14 and is threaded onto the threaded section 13 of the barrel to engage and to be tightly locked against lock nut 16. The weight 24 must be loosened before lock nut 16 can be turned to change the position of the lock nut relative to distal end 14 and must thereafter be tightened against the lock nut 16 to affix the position of the weight relative to the distal end.

To ensure a secure locking engagement between the thread section 13 of the rifle barrel 11, lock nut 16 and threads 25 of tubular weight 24 that will not release upon firing of the gun, a nylon strip 26 is inserted into a groove provided across the threads 13. Thus, when the lock nut and tubular weight are threaded onto the barrel the threads 13, 25 cut into and deform the nylon strip 26, wedging it between the threads to prevent undesired release of the tubular weight and lock nut from the barrel.

Figure 3:
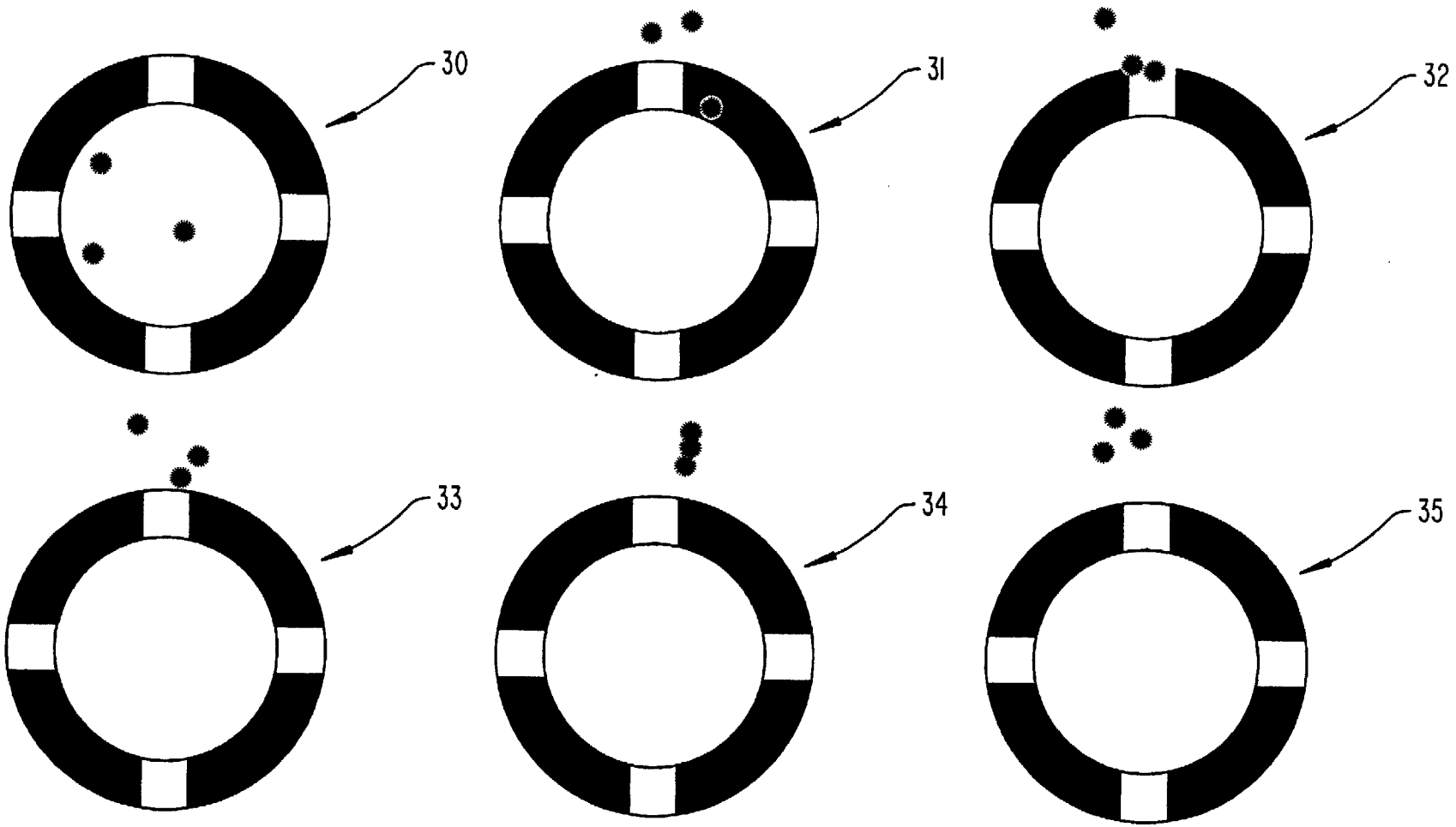
FIG. 3 is a pictorial view of a series of six test targets as actually fired upon with a fixed rifle equipped without the vibration dampener of the invention and with the dampener on the rifle and adjusted to provide different location settings of the weight.

A typical target set of six targets 30–35, used for test firing of a particular rifle, in this case a 22-250 Browning A-Bolt, using Federal 40 grain ammunition, from a fixed location, is shown in FIG. 3. All firing was done at a range of 100 yards and in three round groups. The 0.922 inches shot group of target 30 was fired from the test rifle before the vibration dampener 10 was installed on the rifle.

The shot groups of test targets 31–35 were obtained using the same rifle with the vibration dampener 10 installed. The vibration dampener settings for each of the targets 31–35 were 3.0, 4.0, 5.0, 6.0, and 7.0 turns, respectively. The "sweet spot," for the rifle and ammunition tested was found to be at 6.0 turns, where a grouping of 0.214 inches was obtained.

Figure 4:
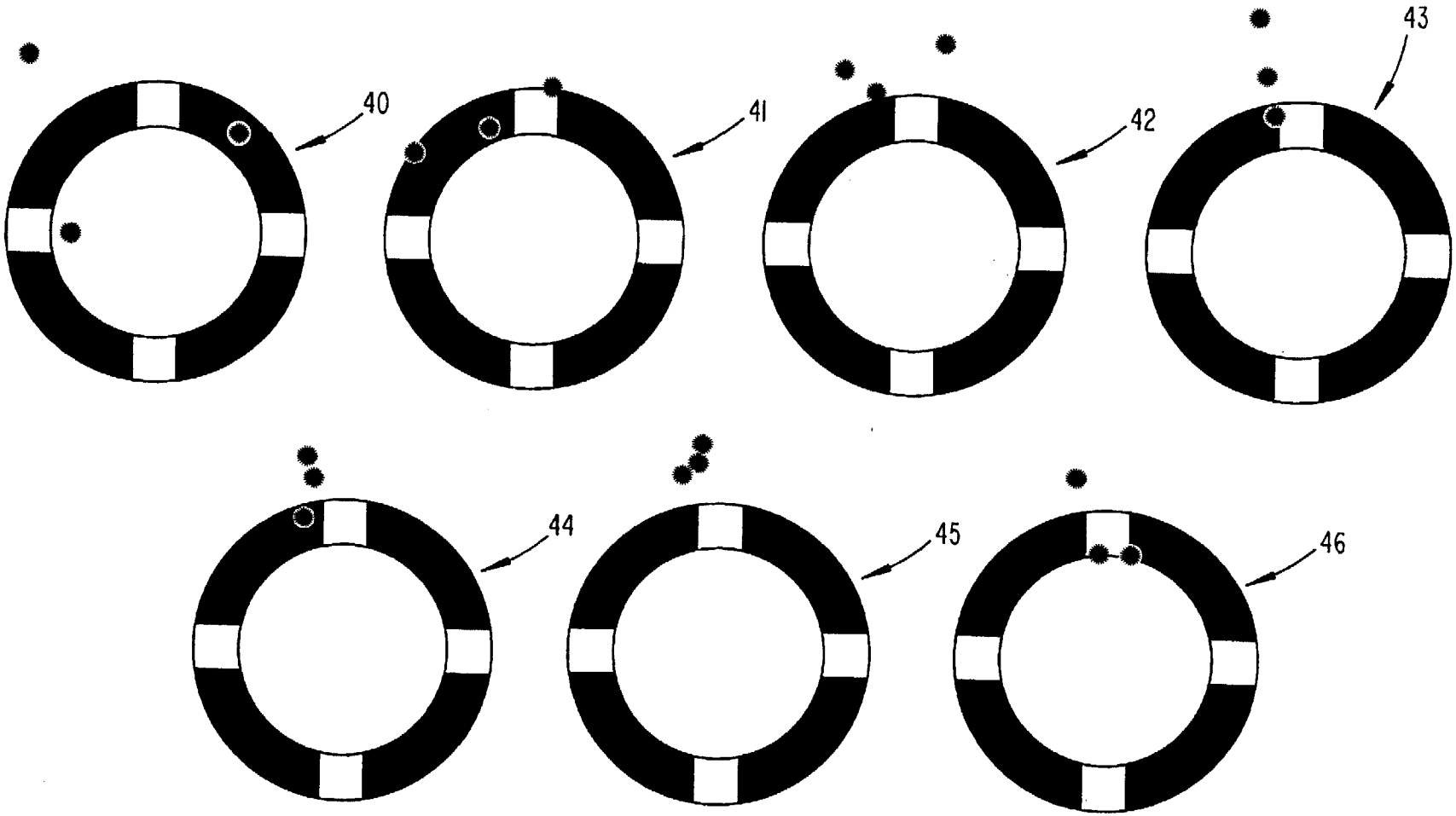
FIG. 4 is a view like that of FIG. 3, showing seven test targets fired upon with the same rifle but [and] using different ammunition than that of FIG. 3.

The same Browning 22-250 A-Bolt rifle was fired in the same manner at another target set of seven targets 40–46, FIG. 4, using Winchester 52 grain ammunition. When the rifle was fired at the target 40, with the vibration dampener removed, a 1.55 inch shot group was obtained.

The shot groups of the targets 41–46 were obtained using the rifle with the vibration dampener 10 installed. The vibration dampener settings for each of the targets 41–46 were 4.0, 5.0, 6.0, 7.0, 8.0, and 9.0 turns, respectively. The "sweet spot" for the rifle and ammunition tested was found to be at 8.0 turns where a grouping of 0.396 inches was obtained.

In another test, a Browning A-Bolt , 30-06 caliber rifle was fired for accuracy at a range of 100 yards and a three round group of 1.349 inches was obtained using Winchester 150 grain ammunition. The rifle was thereafter fitted with the vibration dampener of the invention and fired, using the same ammunition at a series of targets, until the "sweet spot" was found to be at 5.0 turns, where a group of 0.680 inches was observed.

The same rifle, with the vibration dampener removed, was fired using Winchester 220 grain ammunition to obtain a 1.914 inches group. The vibration dampener was refitted and at the 5.0 turns position a group of 1.221 inches was obtained. The "sweet spot" with this ammunition was found to be at the 6.0 turns position, where a group of 0.388 inches was obtained.

Additional test were conducted with 7mm Remington Magnum, .223 Winchester, 30-06 Springfield, .338 Winchester Magnum and 2.70 Winchester calibers. The test results were consistent with those reported previously in this disclosure.

Figure 8:
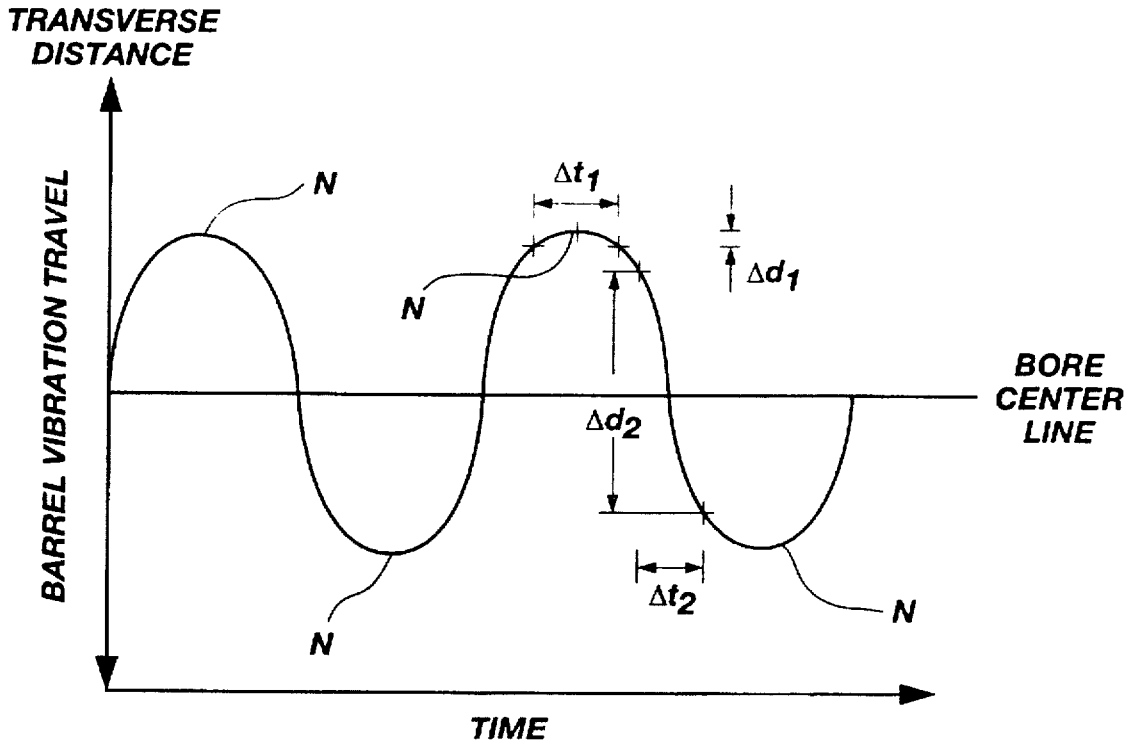
*FIG. 8 is an exemplary curve representative of transverse rifle barrel vibrations after firing of a bullet, plotted against time.*

*In FIG. 8 of the drawings, amplitude of transverse vibrational barrel travel is plotted on the Y-axis against time on the X-axis. It will be appreciated that the previously-referenced "sweet spots" determined during rifle test firing correspond to the anti-node (i.e., peaks and valleys that correspond to minimum barrel velocity) (peaks or valleys) N of the curve, wherein the amplitude of vibration (and hence transverse barrel position)* $\Delta d_1$ *changes very little over time* $\Delta t_1$ *as the bullet exits the barrel muzzle. In contrast, during exemplary time* $\Delta t_2$*, which is equal to* $\Delta t_1$*, it can be seen that the slope of the curve is extremely steep, indicative of relatively large and rapid transverse barrel movement* $\Delta t_2$ *as the bullet exits the muzzle. Thus, bullet exit over a time period such as* $\Delta t_2$ *impairs accuracy.*

Figure 5:
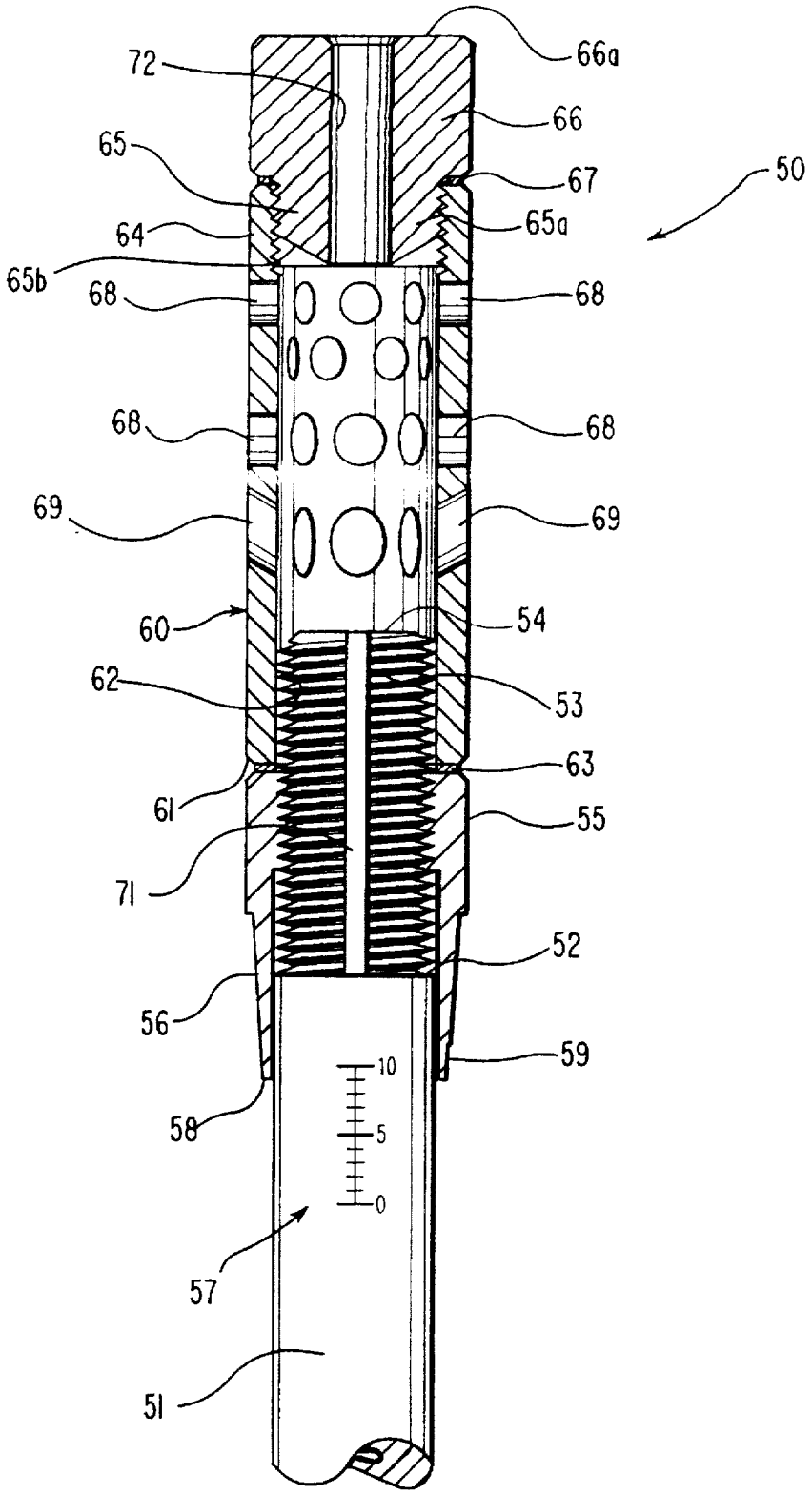
FIG. 5 is a view like that of showing FIG. 2, but showing another preferred embodiment of the invention including a variable weight and a replaceable weight/plug that additionally functions as a muzzle brake.

Another preferred embodiment for the vibration dampener of the system of the invention is shown generally at 50 in FIG. 5. The dampener 50 includes a rifle barrel 51, having a shoulder 52 and an exteriorly threaded portion 53 at the distal end 54 of the barrel.

A lock nut 55 is threaded onto the threaded portion 53 and includes a projecting skirt 56. As in the previously disclosed embodiment, a linear, graduated scale 57 is provided on the outer surface and extends along the length of the rifle barrel 51. The skirt 56 has an edge 58 and another linear, graduated scale 59 is provided on the skirt at the edge 58. Also, as in the previously disclosed embodiment, a preferred relationship between the linear scales, the threads on section 53 and the lock nut are such that one full rotation of the lock nut 55 and scale 59 will move the lock nut along the length of the rifle barrel for a distance equal to that between index marks of the scale 57. The edge 58 of the skirt 56 serves as an indicator cooperating with the scale 57 to indicate the number of turns made to position the nut 55 relative to the distal end 54 of the barrel 51.

A tubular weight element 60 has one end 61 interiorly threaded at 62 so that it can be threaded onto the threaded portion 53 of the barrel 51. The weight element 60 is eventually moved into locked engagement with a lock washer 63 that also engages the lock nut 55 to prevent undesired movement of the weight element 60 relative to the lock nut. The other end 64 of the weight element 60 is interiorly threaded to receive an exteriorly threaded boss 65 of a plug/weight 66. A lock washer 67 on the boss 65 engages the weight element 60 when the boss is fully inserted to prevent undesired movement of the plug/weight 66 relative to the weight element 60.

Nylon strips 71 corresponding to the nylon strip 26 previously described in connection with the embodiment of FIGS. 1 and 2 are also preferably inserted in grooves provided in the threads [62] *53* and the threads 65a of boss 65. The strips 71 function more securely to lock the locking nut 55 and tubular weight element 60 to the rifle barrel and the plug weight 66 to the tubular weight element 60.

Spaced apart ports 68 extend at ninety degrees with respect to the central axis of the rifle bore. Three rows of eight equally spaced ports 68 are provided through the wall of tubular weight element 60. An additional row of eight ports 69, each of which is directed away from the central axis of the rifle bore at a [thirty] *sixty* degree angle and extends, ID to OD, forwardly toward [from] the distal end 66a of the plug 66, is also provided through the wall of the element 60. The ports 68 and 69 allow propulsion gases to be discharged as a bullet is propelled through the barrel and out a bore 72 through the plug/weight 66.

The weight element 60 *and plug/weight 66* thus additionally [acts] *act* as a muzzle brake for the rifle on which [it] *the assembly* is used, and [reduces] *reduce* recoil of the rifle when it is fired. The inserted end 65b of boss 65 helps divert through the ports 68 and 69 gases released upon firing of a bullet as the slug of the bullet travels through bore 72. The end 65b may be tapered, typically at a thirty degree angle with respect to the central axis of the bore 72 through the plug/weight 66.

Plug/weight 66 increases the overall weight applied to the end of barrel 51 and the plug/weight 66 can be interchanged with other similarly constructed plug/weights to vary the overall weight applied to the end of the barrel 51. It is therefore possible to provide for major weight changes, such as may be necessary as the vibration dampener 50 is used with rifles manufactured by different manufactures, different models of rifles, different caliber rifles, and different ammunitions.

Tests were conducted to determine the effectiveness of the ballistic optimizing system shown in FIG. 5 with a variety of production rifles. For data recording purposes, the test rifles were identified as:

| Test Rifle | Caliber |
|---|---|
| A | 30-06 Springfield |
| B | .270 Winchester |
| C | .300 Winchester Magnum |
| D | 7 mm Remington Magnum |
| E | 22-250 Remington |
| F | .338 Winchester Magnum |

The rifles were test fired as received from production and were then re-bedded and test fired after installation of the ballistic optimizing [sound suppressing] system (BOS).

Figure 7:
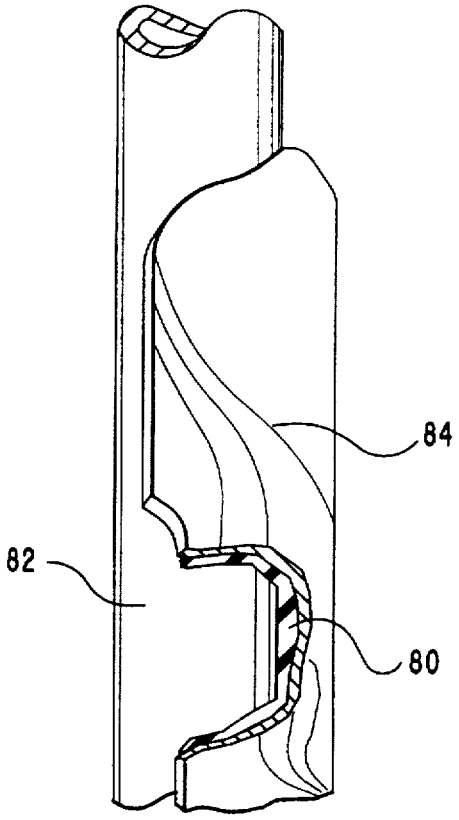
FIG. 7 is a fragmentary perspective view of a portion of a rifle [barrel ] *receiver* mounted [to float] on a layer of bedding material.

The use of bedding has long been common and it is well recognized that proper bedding will increase the accuracy of a rifle. The rifle barrel [is] *floats within the stock and extends from a receiver* preferably mounted [to float] within a mounting well of the stock. The bedding is installed to fill the [floating] space between the [barrel] *receiver* and well. As so positioned, it functions as a shock absorber. "Bedding" refers to a shock absorbent or stabilizer material, which is usually a synthetic rubber or similarly resilient elastomeric material. In the case of the test rifles, a two part pourable liquid urethane rubber bedding compound supplied by Devcon Corporation of Danvers, [Main] *Mass.* under the tradename "FLEXANE 94" was used, as best illustrated by FIG. 7. The rubber bedding 80 between the [barrel] *receiver* 82 and the stock 84 enhanced the accuracy of the BOS system in the rifles tested.

The BOS was mounted to each test rifle after removal of two inches from the end of the respective barrels. The resulting configuration is shown in FIG. 5. The removal of the barrel end and addition of the BOS resulted in a net overall increase to each rifle of approximately one ounce in weight.

All test firing was performed at 100 yards. The rifles were [cooled] *cleaned* every nine rounds when fired with standard calibers and every six rounds when fired with magnum calibers. The results are set forth in TABLE I.

TABLE I

| ACCURACY TESTS | | | | | | |
|---|---|---|---|---|---|---|
| | | | Positions | | GROUPS | |
| Rifle | Caliber | Ammunition | Shot/Index Reading | Sweet Spot* | No BOS | BOS |
| A | 30-06 | Fed. 150 gr. | 0 thru 10 | 10 | 1.453 | .546 |
| | | Win. 220 gr. | 0 thru 6 | 4 | — | .252 |
| B | .270 Win. | Fed. 130 gr. | 0 thru 8 | 1 | 1.447 | .441 |
| | | Fed. P. 150 gr. | 0 thru 7 | 7 | 1.571 | .183 |
| C | .300 Win. Mag. | Fed. 180 gr. | 0 & 1 | 1 | 1.698 | .190 |
| | | Win. 220 gr. | 1 | 1 | 1.951 | .404 |
| D | 7 mm Rem. Mag | Fed. 150 gr. | 5 | 5 | 1.174 | .149 |
| | | Fed. P 165 gr. | 0 | 0 | 1.238 | .342 |
| | | Horn. 175 gr. | 3 | 3 | — | .489 |
| E | 22-250 | Fed. 40 gr. | 1 thru 9 | 3 | .972 | .280 |
| | | Win. 52 gr. | 1 thru 8 | 4 | 1.191 | .171 |
| F | .338 Win. (BAR) | Fed. 210 gr. | 0 thru 9 | 7 | 3.9 | .654 |
| | | Fed. 250 gr. | 0 thru 10 | 3 | — | .894 |

*The "Sweet Spot" is the position of the BOS relative to an index on the barrel where the tightest shot group is obtained.

It was observed that a single full turn of the adjustable weight element 60 and thus also plug/weight 66 can cause a shot group to spread by as much as one inch, or more. In obtaining the data for TABLE I, the positions shot were at full turn markings on the scale 57 of the BOS. Microadjustments, less than one full turn, were not tested, but based on the test results obtained it is apparent that even tighter groups can be obtained after smaller incremental changes are made to the position of the adjustable weight element 60 and plug/weight 66.

A significant recoil reduction was obtained using the BOS. Time/force curves were generated for each rifle tested and peak recoil reduction percentages obtained are as set forth in TABLE II.

TABLE II

| RECOIL REDUCTION | | | |
|---|---|---|---|
| Rifle | Caliber | Ammunition | % Reduction |
| A | 30-06 | Fed. 150 gr. | 34% |
| B | .270 | Fed. 150 gr. | 25% |
| C | .300 Win. Mag. | Rem. 180 gr. | 31% |
| D | 7 mm Rem. Mag. | Rem. 175 gr. | 33% |
| E | 22-250 | Rem. 55 gr. | 48% |
| F | BAR .338 Win. Mag. | Fed. 250 gr. | 34% |

[As previously noted, most muzzle brakes heretofore available result in a very noticeable increase in noise and noise concussion to the marksman. TABLE III reports sound test results of rifles fired both with and without the BOS installed. Sound values are given in decibels. The noise meter used was placed identically with respect to the muzzle of each of the tested rifles.]

[TABLE III

| SOUND TESTS | | | | | | |
|---|---|---|---|---|---|---|
| | | | No. | BOS POSITION | | |
| Rifle | Caliber | Ammo. | System | 0 | 5 | 10 |
| A | 30-06 | Win. 180 gr. | 101.50 | 102.50 | 102.00 | 101.50 |
| B | .270 Win. | Fed. P. 130 gr. | 102.50 | 102.50 | 102.00 | 102.00 |
| C | .300 Win. Mag. | Rem. 180 gr. | 102.00 | 103.75 | 102.00 | 103.50 |
| D | 7 mm Rem. Mag. | Fed. 165 gr. | 101.75 | 101.75 | 101.50 | 101.25 |
| E | 22-250 | Rem. 55 gr. | 101.00 | 101.50 | 100.75 | 101.50 |
| F | 338 Win. Mag. | Fed. 210 gr. | 102.25 | 103.25 | 102.00 | 103.00 |

]

[From TABLE III it can be seen that only minor variations in sound volume occurred in test firings of the rifles without the BOS and the rifles after the BOS had been added. In the few instances where a slight increase in sound was measured, it was not discernable to the marksman.]

Figure 6:
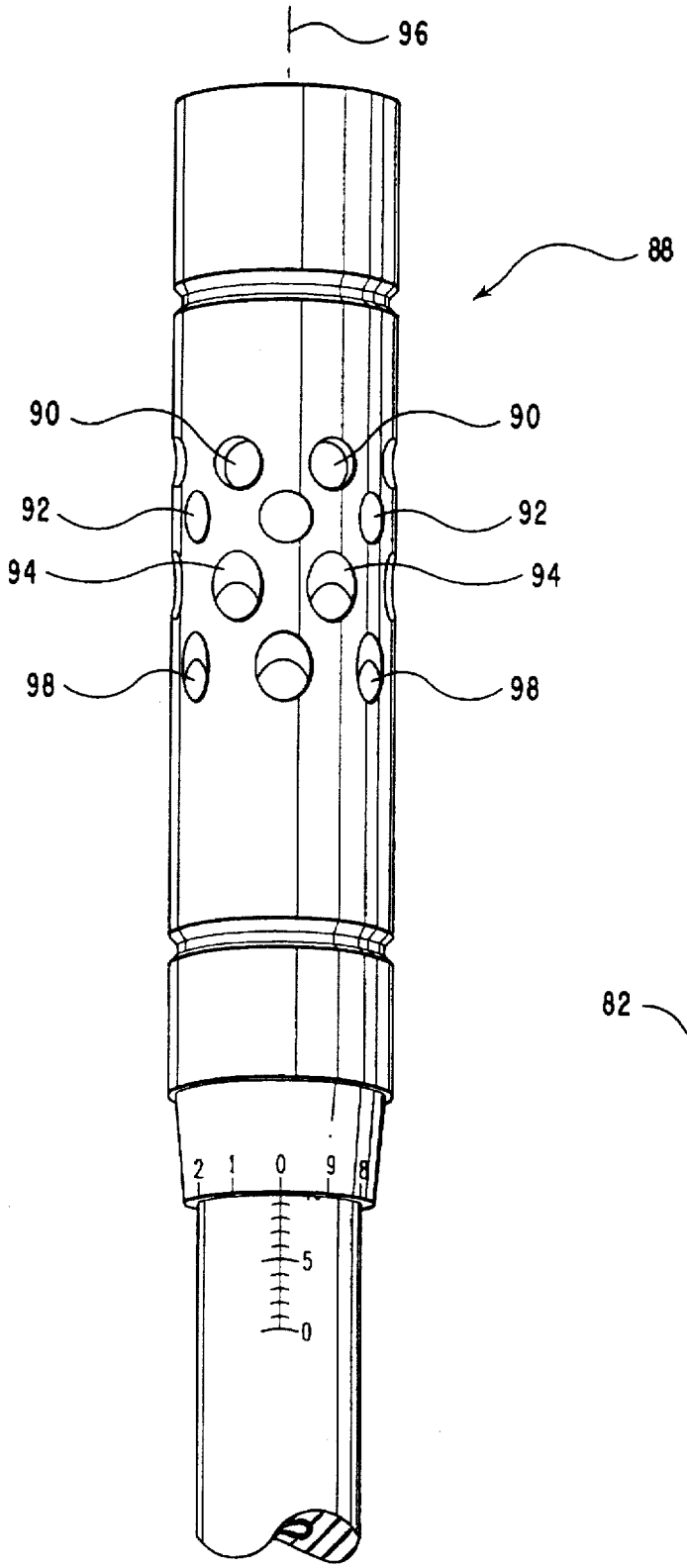
FIG. 6 is a fragmentary perspective view of a presently preferred muzzle brake element.

FIG. 6 illustrates a muzzle brake element 88 incorporating a preferred exhaust port arrangement which assures impingement of the emissions from aligned exhaust ports. The specifically illustrated pattern positions radial bores 90 in a first row and similar radial bores 92 in a second row, the two rows being approximately parallel with individual bores 90 radially offset, as shown, from individual bores 92. A third set of exhaust ports 94 is arranged in a third row approximately parallel the rows defined by bores 90 and 92, respectively. The individual ports 94 are aligned with respective individual bores 90 in a fashion which assures that the discharge from each port 94 impinges upon the discharge from the adjacent aligned-bore 90. As illustrated, the paired ports 94 and bores 90 are aligned parallel the axis 96. A fourth row of ports 98 is arranged in similar paired arrangement with respective bores 92. Thus, the discharges from respective ports 98 impinge upon the radial discharges from corresponding paired individual bores 92. The illustrated and equivalent arrangements provide good muzzle [break] *brake* characteristics [without an appreciable increase in discharge noise].

While preferred embodiments of the invention have been disclosed, it is intended that the invention be limited only by the appended claims, including reasonable equivalents.

What is claimed is:

[1. A ballistic optimizing system for a rifle comprising:

a weight element of predetermined mass; and continuously infinitely adjustable means mounting said weight element on a barrel of a rifle to allow said weight to be positioned toward and away from a distal end of said barrel, the range of adjustability and mass of said weight being sufficient to compensate for inherent ballistic variances between at least two different brands of rifle ammunitions, whereby to effect minimum travel deviation for the projectiles of each of said ammunitions when fired through said rifle barrel.]

[2. A ballistic optimizing system as in claim 1, wherein said weight element is tubular and said means mounting said weight element on said rifle barrel for movement toward and away from said distal end of said barrel comprises exterior threads on said barrel and cooperating interior threads formed in one end of said weight element.]

[3. A ballistic optimizing system as in claim 2, further including means releasably locking said weight element against further movement toward and away from said distal end of said barrel at a selected position on said barrel, said locking means comprising a lock nut threaded onto said barrel and engaged by said weight element.]

[4. A ballistic optimizing system as in claim 1, further including means releasably locking said weight element against further movement toward and away from said distal end of said barrel, at a selected position on said barrel.]

[5. A ballistic optimizing system as in claim 4, wherein said weight element is tubular and said means mounting said weight element on said rifle barrel for movement toward and away from said distal end of said barrel comprises exterior threads on said barrel and cooperating interior threads formed in one end of said weight element.]

[6. A ballistic optimizing system as in claim 5, wherein said means releasably locking said weight element against further movement toward and away from said distal end of said barrel at a selected position comprises a lock nut threaded onto said barrel and engaged by said weight element.]

[7. A ballistic optimizing system as in claim 4, wherein said means releasably locking said weight element against further movement toward and away from said distal end of said barrel at a selected position comprises a lock nut threaded onto said barrel and engaged by said weight element.]

[8. A ballistic optimizing system as in claim 7, further including:

an additional weight; and means to removably secure said additional weight to said weight element.]

[9. A ballistic optimizing system as in claim 4, further including indicator means to indicate the position of said weight element relative to said distal end when said weight element is locked against further movement toward and away from said distal end of said barrel.]

[10. A ballistic optimizing system as in claim 9, wherein said weight element is tubular and said means mounting said weight element on said rifle barrel for movement toward and away from said-distal end of said barrel comprises exterior threads on said barrel and cooperating interior threads formed in one end of said weight element.]

[11. A ballistic optimizing system as in claim 10, wherein said means releasably locking said weight element against further movement toward and away from said distal end of said barrel at a selected position on said barrel comprises a lock nut threaded onto said barrel and engaged by said weight element.]

12. A ballistic optimizing system [as in claim 11, wherein] *comprising:*

*a weight element of predetermined mass;*

*continuously infinitely adjustable means mounting said weight element on a barrel of a rifle to allow said weight to be positioned toward and away from a distal end of said barrel, the range of adjustability and mass of said weight being sufficient to compensate for inherent ballistic variances between at least two different brands of rifle ammunitions, whereby to effect minimum travel deviation for the projectiles of each of said ammunitions when fired through a barrel;*

*means releasably locking said weight element against further movement toward and away from said distal end of said barrel, at a selected position on said barrel;*

*indicator means to indicate the position of said weight element relative to said distal end when said weight element is locked against further movement toward and away from said distal end of said barrel;*

*wherein said weight element is tubular and said means mounting said weight element on said rifle barrel for movement toward and away from said distal end of said barrel comprises exterior threads on said barrel and cooperating interior threads formed in one end of said weight element;*

*wherein said means releasably locking said weight element against further movement toward and away from said distal end of said barrel at a selected position on said barrel comprises a lock nut threaded onto said barrel and engaged by said weight element;* said indicator means to indicate said position of said weight element relative to said distal end when said weight element is locked against further movement toward and away from said distal end of said barrel includes a linear scale having equally spaced indices formed on said barrel and means carried by said lock nut and forming an indicator cooperating with said indices.

13. A ballistic optimizing system as in claim 12, wherein said means carried by said lock nut and forming an indicator cooperating with said indices comprises a skirt projecting from said lock nut, said skirt telescoping over a portion of said barrel and having an edge forming an indicator cooperating with said indices.

14. A ballistic optimizing system as in claim 13 wherein, said weight element includes a portion extending beyond said distal end of said barrel; and spaced apart holes are provided through said wall of said tubular weight element.

15. A ballistic optimizing system as in claim 13, further including:

a plug/weight; and means to removably secure said plug/weight to another end of said tubular weight element.

16. A ballistic optimizing system as in claim 15, wherein, said other end of said tubular weight element is interiorly threaded;

said plug/weight has a bore therethrough; and said means to removably secure said plug/weight to said other end of said tubular weight includes exterior threads on said plug/weight threaded into said interior threads at Bid other end of said tubular weight element.

17. A ballistic optimizing system as in claim 16, further including:

a lock washer surrounding threads on said barrel and between said lock nut and said tubular weight element; and a lock washer surrounding threads on said plug/weight and between said plug/weight and said tubular weight element.

18. A ballistic optimizing system as in claim 17, wherein the relationship between said threads on said barrel and said threads in said lock nut is such that one full rotation of said lock nut relative to said barrel moves said lock nut axially along said barrel a distance equal to spacing between adjacent indices on said barrel.

19. A ballistic optimizing system as in claim 18, further including another linear scale having equally spaced indices spaced around said skirt of said lock nut, adjacent to said edge.

20. A ballistic optimizing system mounted on a rifle barrel with an exterior surface, a graduated line scale on said exterior surface and threads on said exterior surface at the muzzle end of said barrel, said ballistic optimizing system comprising:

a lock nut adjustably threaded on said threads of said barrel:

means extending from said lock nut, including a portion cooperating with said linear scale as a position indicator; and a tubular weight element of predetermined mass, adjustably threaded onto said barrel in locking engagement with said locking nut.

21. A ballistic optimizing system as in claim 20, wherein said means extending from said locking nut comprises a skirt extending around said barrel and having an edge cooperating with said linear scale as a position indicator of said weight element.

22. A ballistic optimizing system as in claim 21, wherein the relationship between said threads connecting said lock nut and said barrel and indices of said linear scale on said barrel provides for movement of said edge of said skirt axially along said barrel between adjacent indices upon one full rotation of said locking nut relative to said barrel.

23. A ballistic optimizing system as in claim 22, further including equally spaced index marks forming a scale around said skirt adjacent said edge.

24. A ballistic optimizing system as in claim 22, further including an additional weight removably secured to said tubular weight element.

25. A ballistic optimizing system as in claim 22, further including threads in said tubular weight element; and a plug/weight having a bore therethrough and threaded into said threads in said tubular weight element.

26. A ballistic optimizing system as in claim 25, further including spaced holes through a wall of said tubular weight element, between said distal end of said barrel and said plug/weight.

27. A ballistic optimizing system as in claim 26, wherein, said holes through said wall of said tubular weight element include rows of holes each having[,] a central axis extending normal to a central axis of said barrel and encircling said wall of said tubular weight element and a row of holes each having a central axis extending at an angle of [thirty] *sixty* degrees to said axis of said barrel and encircling said wall of said tubular weight element.

28. A ballistic optimizing system for a bedded rifle barrel comprising:

a weight element; and means mounting said weight element of a bedded rifle barrel to be infinitely adjustably positioned toward and away from a distal end of said barrel, between preset extreme limits.

29. A ballistic optimizing system mounted on a [bedded] rifle barrel with an exterior surface, a graduated line scale on said exterior surface and threads on said exterior surface at the muzzle end of said barrel, said barrel [being] *extending from a receiver* mounted [in] *to* a resilient bed carried by a stock, and said ballistic optimizing system comprising:

a lock nut adjustably threaded on said threads of said barrel;

means extending from said lock nut including a portion cooperating with said linear scale as a position indicator; and a tubular weight element of predetermined mass, adjustably threaded onto said barrel and in locking engagement with said locking nut.

30. A ballistic optimizing system as in claim 29, wherein said means extending from said locking nut comprises a skirt extending around said barrel and having an edge cooperating with said linear scale as a position indicator of said weight element.

31. A ballistic optimizing system as in claim 30, wherein the relationship between said threads connecting said lock nut and said barrel and indices of said linear scale on said barrel provides for movement of said edge of said skirt axially along said barrel between adjacent indices upon one full rotation of said locking nut relative to said barrel.

32. A ballistic optimizing system as in claim 31, further including equally spaced index marks forming a scale around said skirt adjacent said edge.

33. A ballistic optimizing system as in claim 31, further including an additional weight removably secured to said tubular weight element.

34. A ballistic optimizing system as in claim 31, further including threads in said tubular weight element; and a plug/weight having a bore therethrough and threaded into said threads in said tubular weight element.

35. A ballistic optimizing system as in claim 34, further including spaced holes through a wall of said tubular weight element, between said distal end of said barrel and said plug/weight.

36. A ballistic optimizing system as in claim 35, wherein, said holes through said wall of said tubular weight element include rows of holes each having a central axis extending normal to central axis of said barrel and encircling said wall of said tubular weight element and a row of holes each having a central axis extending at an angle of [thirty] *sixty* degrees to said axis of said barrel and encircling said wall of said tubular weight element.

37. A ballistic optimizing system as in claim 35, wherein said holes through said wall of said tubular weight element include rows of holes each having a central axis extending normal to a central axis of said barrel and encircling said wall of said tubular weight element *and* at least one row of holes each being positioned to have a central axis extending angularly with respect to said axis of said barrel and such that gases discharged therethrough from said barrel will engage gases discharged from said barrel through a said hole having an axis extending normal to said axis of said barrel.

38. A ballistic optimizing system mounted on the muzzle end of a rifle barrel, said barrel having an exterior surface with a threaded distal portion and a graduated line scale adjacent said threaded distal portion, said ballistic optimizing system comprising:

a lock nut threaded on said threaded distal portion of said barrel;

position indicator means extending from said lock nut comprising a skirt extending around said barrel and having an edge cooperating with said linear scale as a position indicator of said weight element, and further including index marks forming a scale around said skirt adjacent said edge; and a tubular weight element threaded onto said barrel and in locking engagement with said locking nut.

39. A ballistic optimizing system as in claim 38, wherein the relationship between the threads of said distal portion connecting said lock nut and said barrel and the indices of said linear scale on said barrel provides for movement of said edge of said skirt between adjacent indices along said barrel upon one full rotation of said locking nut relative to said barrel.

40. A ballistic optimizing system as in claim 38, including spaced holes through the wall of said tubular weight element, further including means to removably secure an additional weight to said tubular weight element including:

threads in said tubular weight element; and a plug/weight having a bore therethrough and threaded into said threads in said tubular weight element:

wherein said holes through said wall of said tubular weight element between said distal end of said barrel and said plug/weight include at least one row of holes each having a central axis extending normal to a central axis of said barrel and said holes encircling said wall of said tubular weight element and at least one row of holes each being positioned to have a central axis extending angularly with respect to said axis of said barrel and such that gases discharged therethrough will engage gases discharged through a said hole having an axis extending normal to said axis of said barrel.

41. A ballistic optimizing system mounted on the muzzle end of a rifle barrel *extending from receiver* mounted to a resilient bed carried by a stock, said barrel having an exterior surface with a threaded distal portion and a graduated line scale adjacent said threaded distal portion, said ballistic optimizing system comprising:

a lock nut threaded on said threaded distal end of said barrel;

position indicator means extending from said lock nut comprising a skirt extending, around said barrel and having an edge cooperating with said linear scale as a position indicator of said weight element, and further including index marks forming a scale around said skirt adjacent said edge; and a tubular weight element threaded onto said distal end and in locking engagement with said locking nut.

42. A ballistic optimizing system as in claim 41, wherein the relationship between the threads of said distal end connecting said lock nut and said barrel and the indices of said linear scale on said barrel provides for movement of said edge of said skirt between adjacent indices along said barrel upon one full rotation of said locking nut relative to said barrel.

43. A ballistic optimizing system as in claim 41, including spaced holes through the wall of said tubular weight element further including means to removably secure an additional weight to said tubular weight element including:

threads in said tubular weight element; and a plug/weight having a bore therethrough and threaded into said threads in said tubular weight element;

wherein said holes through said wall of said tubular weight clement between said distal end of said barrel and said plug/weight include at least one row of holes each having a central axis extending normal to a central axis or said barrel and said holes encircling said wall of said tubular weight element and at least one row of holes each being positioned to have a central axis extending angularly with respect to said axis of said barrel and such that gases discharged therethrough will engage gases discharged through a said hole having an axis extending normal to said axis of said barrel.

44. In combination:

a rifle with a barrel having a chamber end, a muzzle end and a longitudinal axis between said chamber and muzzle ends; and a ballistic optimization device comprising:

a weight element;

means mounting said weight element on said muzzle end, said means being structured and arranged for locating said weight *element* along said axis at a position appropriate to [establish the center of gravity] *modify vibrational characteristics* of said barrel to ensure minimum travel deflection for each of various rifle ammunitions; said mounting means comprising exterior threads on said barrel and cooperating interior threads formed in one end of said weight element;

means releasably locking said weight element against further movement toward and away from said distal end of said barrel, at a selected position on said barrel; wherein said releasable locking means comprises a lock nut threaded onto said barrel and engaged by said weight element; *and* indicator means to indicate the position of said weight element relative to said distal end when said weight element is locked against further movement toward and away from said distal end of said barrel; wherein said indicator means includes a linear scale having equally spaced indices formed on said barrel and a second linear scale carried on a skirt projecting from said lock nut and telescoping over a portion of said barrel, and forming an indicator cooperating with said indices.

45. A combination according to claim 44 wherein said chamber end of said barrel [is] *extends from a receiver* mounted to a stock and said barrel *receiver* is separated from said stock by a resilient bedding member.

46. A combination as in claim 44, including spaced holes through the wall of said tubular weight element, further including means to removably secure an additional weight to said tubular weight element including:

threads in said tubular weight element: and a plug/weight having a bore therethrough and threaded into said threads in said tubular weight element;

wherein said holes through said wall of said tubular weight element between said distal end of said barrel and said plug/weight include at least one row of holes each having a central axis extending normal to a central axis or said barrel and said holes encircling said wall of said tubular weight element and at least one row of holes each being positioned to have a central axis extending angularly with respect to said axis of said barrel and such that gases discharged therethrough will engage gases discharged through a said hole having an axis extending normal to said axis of said barrel.

47. A combination according to claim 46 wherein said chamber end of said barrel [is] *extends from a receiver* mounted to a stock and said [barrel] *receiver* is separated from said stock by a resilient bedding member.

*48. A method of tuning vibrations of a rifle barrel to increase accuracy, comprising the steps of:*

*positioning a weight at a first position on a rifle barrel;*

*providing an indicator to allow continuous, infinitely variable axial indications of positions of the weight on the rifle barrel;*

*using the indicator to indicate a first axial position of the weight on the rifle barrel;*

*shooting the rifle to determine accuracy of the rifle with the weight at the first axial position;*

*repositioning the weight on the rifle barrel at a second axial position;*

*using the indicator to indicate a second axial position of the weight on the rifle barrel;*

*shooting the rifle to determine accuracy of the rifle with the weight at the second axial position;*

*locking the weight on the rifle barrel at one of the first axial position or the second axial position to improve accuracy of the rifle.*

*49. The method of claim 48 wherein the step of locking the weight on the rifle barrel comprises affixing the weight at an axial position so that a bullet discharged from the rifle exits the rifle barrel at an anti-node of extreme muzzle movement to increase accuracy of the rifle.*

*50. The method of claim 48 further comprising the steps of:*

*providing a lock nut;*

*attaching the lock nut to the rifle barrel adjacent the weight;*

*positioning the lock nut to engage and lock against the weight to secure the weight in an axial position along the rifle barrel.*

*51. The method of claim 48 further comprising the steps of:*

*wherein the indicator comprises a first linear scale having a plurality of graduations disposed on the rifle barrel;*

*and wherein the steps of using the indicator to indicate a first axial position and a second axial position of the weight on the rifle barrel comprises observing the respective graduations upon shooting the rifle with the weight positioned at the respective axial positions.*

*52. The method of claim 48 further comprising the steps of:*

*providing a lock nut;*

*attaching the lock nut to the rifle barrel adjacent the weight;*

*positioning the lock nut to engage and lock against the weight to secure the weight in an axial location along the rifle barrel;*

*wherein the indicator comprises a first linear scale having a plurality of graduations on the rifle barrel, and a second linear scale having a plurality of graduations on the lock nut;*

*wherein the steps of using the indicator to indicate a first axial position and a second axial position of the weight on the rifle barrel comprises observing the respective graduations on the first and second linear scales upon shooting the rifle with the weight positioned at the respective axial positions.*

*53. The method of claim 48 further comprising the steps of:*

*providing a plurality of ports in the weight;*

*diverting propulsion gases generated from discharging the rifle through the ports.*

*54. The method of claim 48 wherein the step of repositioning the weight on the rifle barrel comprises repositioning the weight on the rifle barrel at two axial positions, and further comprising the steps of using the indicator to indicate the two axial positions of the weight to the rifle barrel.*

*55. A method of tuning vibrations of a rifle barrel to increase accuracy, comprising the steps of:*

*providing a rifle including a rifle barrel having a distal end;*

*positioning a weight on the rifle barrel so that at least a portion of the weight extends beyond the distal end;*

*moving the weight axially along the rifle barrel to a plurality of axial locations;*

*shooting the rifle barrel at each of the axial locations to determine accuracy of the rifle with the weight at the respective axial locations;*

*locking the weight on the rifle barrel at one of the plurality of axial locations corresponding to improved accuracy.*

*56. The method of claim 55 wherein the step of locking the weight on the rifle barrel comprises affixing the weight at an axial location so that a bullet discharged from the rifle exits the rifle barrel at an anti-node of extreme muzzle movement to increase accuracy of the rifle.*

*57. The method of claim 55 further comprising the steps of:*

*providing a lock nut;*

*positioning the lock nut on the rifle barrel adjacent the weight to engage and lock against the weight to secure the weight at one of the plurality of axial locations on the rifle barrel corresponding to improved accuracy.*

*58. The method of claim 55 further comprising the steps of:*

*providing a first linear scale having a plurality of graduations on the rifle barrel;*

*observing the respective graduations upon shooting the rifle with the weight positioned at each of the respective axial locations.*

*59. The method of claim 55 further comprising the steps of:*

*providing a lock nut;*

*attaching the lock nut to the rifle barrel adjacent the weight to engage and lock against the weight to secure the weight at one of the plurality of axial locations on the rifle barrel;*

*providing a first linear scale having a plurality of graduations on the rifle barrel;*

*providing a second linear scale having a plurality of graduations on the lock nut;*

*observing the respective graduations on the first and second linear scales upon shooting the rifle with the weight positioned at each of the respective axial locations.*

*60. The method of claim 55 wherein the step of positioning a weight on the rifle barrel comprises threading the weight onto the distal end of the rifle barrel.*

*61. The method of claim 55 further comprising the steps of:*

*providing a plurality of ports in the weight;*

*diverting propulsion gases generated from discharging the rifle through the ports.*

*62. The method of claim 55 wherein the step of positioning the weight on the rifle barrel comprises positioning the weight on the rifle barrel at more than two axial locations, and further comprising the steps of using an indicator to indicate the more than two axial locations relative to the rifle barrel.*

*63. A method of tuning vibrations of a rifle barrel to increase accuracy, comprising the steps of:*

*providing a rifle barrel;*

*providing a weight securable to the rifle barrel and movable axially relative to the rifle barrel;*

*positioning the weight on the rifle barrel at a position corresponding to improved accuracy;*

*providing an indicator to allow continuous, infinitely variable axial indications of positions of the weight on the rifle barrel;*

*using the indicator to indicate the position of the weight on the rifle barrel corresponding to improved accuracy.*

*64. The method of claim 63, further comprising the steps of:*

*providing a plurality of ports in the weight;*

*allowing propulsion gases to be discharged through the ports as a bullet is propelled through the rifle barrel.*

*65. The method of claim 63, further comprising the step of rotating the weight relative to the rifle barrel to move the weight axially relative to the rifle barrel.*

*66. A barrel vibration damping system for rifles, comprising:*

*a rifle barrel having a distal end;*

*a weight securable to and movable relative to the distal end of the rifle barrel, the weight dampening barrel vibrations to achieve improved accuracy;*

*a relationship between the weight and the rifle barrel to allow continuous, infinitely variable axial movement of the weight relative to the rifle barrel to position the weight at a selected damping location on the rifle barrel corresponding to increased accuracy;*

*a retaining mechanism to retain the weight at the selected damping location on the rifle barrel corresponding to increased accuracy;*

*an indicator on the rifle barrel to indicate the selected damping location of the weight on the rifle barrel corresponding to increased accuracy.*

*67. The barrel vibration damping system of claim 66 wherein the indicator comprises a first linear scale disposed on the rifle barrel and a second linear scale disposed on the retaining mechanism, the first linear scale and the second linear scale cooperating with each other to indicate the position of the weight on the rifle barrel.*

*68. The barrel vibration damping system of claim 93, further comprising a nylon strip disposed between the weight and the rifle barrel to ensure locking engagement between weight and the rifle barrel.*

*69. The barrel vibration damping system of claim 66 wherein the retaining mechanism comprises a lock nut.*

*70. A barrel vibration damping system for rifles, comprising:*

*a rifle barrel having a distal end;*

*a radially symmetrical weight securable to and movable relative to the distal end of the rifle barrel, the radial symmetry of the weight allowing the weight to rotate and move axially along the rifle barrel in an incremental, continuously variable manner to continuously change dampening of the rifle barrel vibrations for achieving improved accuracy;*

*a retaining mechanism to retain the weight at the selected damping position on the rifle barrel corresponding to increased accuracy;*

*an indicator on the rifle barrel to indicate the selected damping position of the weight on the rifle barrel corresponding to increased accuracy.*

*71. The barrel vibration damping system of claim 70 wherein the indicator comprises a first linear scale disposed on the rifle barrel and a second linear scale disposed on the retaining mechanism, the first linear scale and the second linear scale cooperating with each other to indicate the position of the weight on the rifle barrel.*

*72. The barrel vibration damping system of claim 70, further comprising a nylon strip disposed between the weight and the rifle barrel to ensure locking engagement between weight and the rifle barrel.*

*73. The barrel vibration damping system of claim 70 wherein the retaining mechanism comprises a lock nut.*

*74. A barrel vibration damping system for rifles, comprising:*

*a rifle barrel having a distal end;*

*a weight securable to the distal end of the rifle barrel to dampen barrel vibrations for achieving improved accuracy, a portion of the weight extending beyond the distal end of the rifle barrel, the weight being axially movable relative to the distal end of the rifle barrel;*

*a retaining mechanism to retain the weight at the selected damping position on the rifle barrel corresponding to increased accuracy;*

*an indicator on the rifle barrel to indicate the selected damping position of the weight on the rifle barrel corresponding to increased accuracy.*

*75. The barrel vibration damping system of claim 74 wherein the indicator comprises a first linear scale disposed on the rifle barrel and a second linear scale disposed on the retaining mechanism, the first linear scale and the second linear scale cooperating with each other to indicate the position of the weight on the rifle barrel.*

*76. The barrel vibration damping system of claim 74, further comprising a nylon strip disposed between the weight and the rifle barrel to ensure locking engagement between weight and the rifle barrel.*

*77. The barrel vibration damping system of claim 74 wherein the retaining mechanism comprises a lock nut.*

* * * * *